(12) United States Patent
Koh et al.

(10) Patent No.: US 12,686,274 B2
(45) Date of Patent: Jul. 21, 2026

(54) MULTI-FUNCTIONAL SWITCH FOR A VEHICLE AND A METHOD OF CONTROLLING THE SAME

(71) Applicants: HYUNDAI MOTOR COMPANY, Seoul (KR); KIA CORPORATION, Seoul (KR); LS AUTOMOTIVE TECHNOLOGIES CO., LTD., Anyang-si (KR)

(72) Inventors: Jin Young Koh, Suwon-si (KR); Kyeoung Il Cho, Anyang-si (KR)

(73) Assignees: HYUNDAI MOTOR COMPNY, Seoul (KR); KIA CORPORATION, Seoul (KR); LS AUTOMOTIVE TECHNOLOGIES CO., LTD., Anyang-si (KR)

( * ) Notice: Subject to any disclaimer, the term of this patent is extended or adjusted under 35 U.S.C. 154(b) by 84 days.

(21) Appl. No.: 18/651,100

(22) Filed: Apr. 30, 2024

(65) Prior Publication Data

US 2025/0187439 A1 Jun. 12, 2025

(30) Foreign Application Priority Data

Dec. 6, 2023 (KR) ........................ 10-2023-0175596

(51) Int. Cl.
| | |
|---|---|
| *B60K 35/81* | (2024.01) |
| *B60K 35/21* | (2024.01) |

(Continued)

(52) U.S. Cl.
CPC .............. *B60K 35/81* (2024.01); *B60K 35/22* (2024.01); *B60W 50/0205* (2013.01); *G07C 5/008* (2013.01); *B60W 2756/10* (2020.02)

(58) Field of Classification Search
CPC ........ B60K 35/81; B60K 35/22; B60K 35/21; B60K 35/85; B60W 50/0205;
(Continued)

(56) References Cited

U.S. PATENT DOCUMENTS

| | | | | |
|---|---|---|---|---|
| 12,122,401 B1 * | 10/2024 | Millar | ................... | B60W 50/06 |
| 2015/0046352 A1 * | 2/2015 | Blitz | ................... | H04W 12/126 |
| | | | | 705/318 |

(Continued)

*Primary Examiner* — Tyler D Paige
(74) *Attorney, Agent, or Firm* — Lempia Summerfield Katz LLC

(57) ABSTRACT

A multi-functional switch for a vehicle includes a communication unit configured to receive a specification code for electronic devices determined according to a vehicle identification number of the vehicle by communicating with a diagnostic server. The communication unit is also configured to receive specification information for checking whether the electronic devices are present in the vehicle by communicating with an electronic control unit inside the vehicle. The multi-functional switch also includes a storage unit configured to store the specification code received from the diagnostic server. The multi-functional switch additionally includes a display unit and a control unit. The control unit is configured to control the display unit to display images corresponding to functions of the electronic devices based on the specification code and the specification information received through the communication unit.

6 Claims, 9 Drawing Sheets

(51) Int. Cl.
  *B60K 35/22*   (2024.01)
  *B60R 16/00*   (2006.01)
  *B60W 50/02*   (2012.01)
  *G07C 5/00*   (2006.01)

(58) Field of Classification Search
  CPC .. B60W 2756/10; G07C 5/008; B60R 16/005;
        B60R 16/023; G05B 23/0205
  USPC .......................................................... 701/36
  See application file for complete search history.

(56)        References Cited

U.S. PATENT DOCUMENTS

2018/0022299 A1\*   1/2018   Han ....................... B60R 16/033
                        701/36
2019/0052265 A1\*   2/2019   Yokoyama ............. H03K 17/96
2025/0187439 A1\*   6/2025   Koh ........................ G07C 5/008

\* cited by examiner

| BIT | Factor | YES(1) NO(0) | NOTE |
|---|---|---|---|
| 7 | ALC | 1 | WHETHER HEADLIGHT AUTO-LIGHTING FUNCTION IS PRESENT |
| 6 | HBA | 1 | WHETHER HIGH BEAM ASSIST FUNCTION IS PRESENT |
| 5 | FRONT FOG LIGHT | 1 | WHETHER FRONT FOG LIGHT IS PRESENT |
| 4 | REAR FOG LIGHT | 0 | WHETHER REAR FOG LIGHT IS PRESENT |
| 3 | Not used | 0 | NOT USED |
| 2 | IMAGE FORMAT | 0 | 0 : TEXT TYPE, 1 : SYMBOL TYPE |
| 1 | RAIN SENSOR | 0 | WHETHER RAIN SENSOR IS PRESENT |
| 0 | REAR WIPER | 0 | WHETHER REAR WIPER IS PRESENT |

| 7 | 6 | 5 | 4 | 3 | 2 | 1 | 0 |
|---|---|---|---|---|---|---|---|
| HEADLIGHTS | | FOG LIGHTS | | Not used | IMAGE TYPE | Wiper | |
| ALC | HBA | FRONT FOG LIGHT | REAR FOG LIGHT | X | | RAIN SENSOR | REAR WIPER |
| 1 | 1 | 1 | 0 | - | - | - | - |

Bit 0

| 7 | 6 | 5 | 4 | 3 | 2 | 1 | 0 |
|---|---|---|---|---|---|---|---|
| HEADLIGHTS | | REAR FOG LIGHT | | Not used | IMAGE TYPE | Wiper | |
| ALC | HBA | FRONT FOG LIGHT | REAR FOG LIGHT | X | | RAIN SENSOR | REAR WIPER |
| - | - | - | - | 0 | 0 | 0 | 1 |

MULTI-FUNCTIONAL SWITCH FOR A VEHICLE AND A METHOD OF CONTROLLING THE SAME

CROSS-REFERENCE TO RELATED APPLICATION

This application claims priority to and the benefit of Korean Patent Application No. 10-2023-0175596, filed in the Korean Intellectual Property Office on Dec. 6, 2023, the entire contents of which are hereby incorporated herein by reference.

BACKGROUND

(a) Technical Field

The present disclosure relates to a multi-functional switch for a vehicle and a method of controlling the same.

(b) Description of the Related Art

Generally, a driver's seat of a vehicle is provided with a multi-functional switch that controls various electronic components of the vehicle on the steering wheel. A driver operates wipers and lighting devices of the vehicle through the multi-functional switch.

In a conventional multi-functional switch, functions (e.g., wiper operating functions, lighting device operating functions, etc.) predefined at a vehicle development stage are engraved or printed as images corresponding to the respective functions.

In the conventional art, because the predefined functions are engraved or printed on the multi-functional switch, if a specific function is changed or eliminated during a vehicle production process, it is required to separately manufacture a new multi-functional switch. Accordingly, there has been a problem that a vehicle manufacturing cost increases.

The above information disclosed in this Background section is only to enhance understanding of the background of the disclosure. Therefore, the Background section may contain information that does not form prior art that is already known to those having ordinary skill in the art.

SUMMARY

Embodiments of the present disclosure provide a multi-functional switch capable of reducing a vehicle manufacturing cost.

According to an embodiment of the present disclosure, a multi-functional switch of a vehicle is provided. The multi-functional switch includes a communication unit configured to i) receive a specification code for electronic devices determined according to a vehicle identification number of the vehicle by communicating with a diagnostic server and ii) receive specification information for checking whether the electronic devices are present in the vehicle by communicating with an electronic control unit in the vehicle. The multi-functional switch also includes a storage unit configured to store the specification code received from the diagnostic server. The multi-functional switch further includes a display unit and a control unit. The control unit is configured to control the display unit to display images corresponding to functions of the electronic devices based on the specification code and the specification information received through the communication unit.

The control unit may be configured to, when the specification code and the specification information match, control the display unit to display images corresponding to functions of the electronic devices according to the specification code.

The control unit may be configured to, when the specification code and the specification information are different from each other, generate a diagnostic trouble code and transmit the diagnostic trouble code to the diagnostic server through the communication unit.

The display unit may include a first display unit displaying first functions of the electronic devices and a second display unit displaying second functions of the electronic devices.

The first functions may be functions of lighting devices. The second functions may be functions of wiper devices.

The specification code may include a plurality of bits. The functions of the electronic devices may be indicated by values of the plurality of bits.

According to another embodiment of the present disclosure, a method of controlling a multi-functional switch for a vehicle is provided. The method includes receiving, by a communication unit, a specification code for electronic devices determined according to a vehicle identification number of the vehicle from a diagnostic server. The method also includes receiving, by the communication unit, specification information for checking whether the electronic devices are present in the vehicle by communicating with an electronic control unit of the vehicle. The method additionally includes controlling, by a control unit, a display unit to display images corresponding to functions of the electronic devices based on the specification code and the specification information.

Controlling the display unit may include, when the specification code and the specification information match, controlling the display unit to display images corresponding to the electronic devices according to the specification code.

The method may further include, when the specification code and the specification information are different from each other, transmitting a diagnostic trouble code to the diagnostic server.

The specification code may include a plurality of bits. The method may include determining whether the electronic devices are provided in the vehicle based on values of the plurality of bits.

According to embodiments of the present disclosure, it is possible to reduce a vehicle manufacturing cost by displaying images or symbols corresponding to functions of electronic devices provided in the vehicle on a display unit of a multi-functional switch according to a specification code transmitted from a diagnostic server, because there is no need to separately engrave the images corresponding to the functions of the electronic devices on the multi-functional switch according to the specifications of the vehicle.

Other effects that can be obtained or expected from the embodiments of the present disclosure are disclosed directly or implicitly in the detailed description of the present disclosure. In other words, various effects obtained or expected according to the present disclosure are disclosed directly or implicitly in the following detailed description.

BRIEF DESCRIPTION OF THE DRAWINGS

Because the drawings are provided for reference to describe embodiments of the present disclosure, the technical idea of the present disclosure should not be interpreted as limited to the accompanying drawings.

FIG. 6 is a conceptual diagram illustrating a configuration of a specification code, according to an embodiment.

Figure 1:
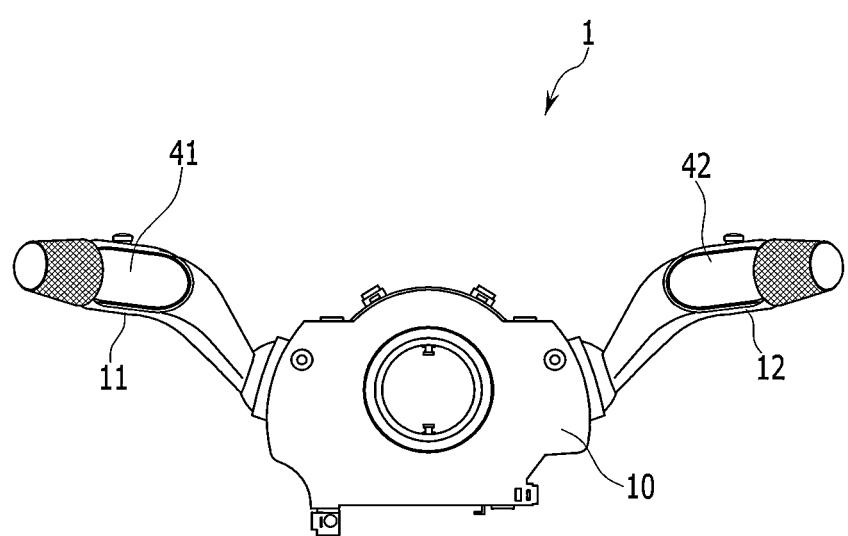
FIG. 1 is a diagram illustrating a configuration of a multi-functional switch, according to an embodiment.

The drawings referred to above are not necessarily drawn to scale. The drawings should be understood as presenting somewhat simplified expressions of various features illustrating the basic principles of the present disclosure. For example, specific design features of the present disclosure, including specific dimensions, orientations, locations, and shapes, will be determined in part by the particularly intended application and use environment.

DETAILED DESCRIPTION

The terminology used herein is for the purpose of describing particular embodiments of the present disclosure. The terminology is not intended to limit the present disclosure. As used herein, singular forms are intended to include plural forms unless the context clearly dictates otherwise. It should be further understood that the terms "comprises", "comprising", "includes", "including", or the like, specify the presence of the mentioned features, integers, steps, operations, constituent elements, and/or components when used in the present specification. However, these terms do not preclude the presence or addition of one or more other features, integers, steps, operations, constituent elements, components, and/or groups thereof. As used herein, the term "and/or" includes any one or all combinations of the associated listed items.

Additionally, it should be understood that one or more of the methods or aspects thereof described below may be executed by at least one controller (sometimes referred to herein as "control unit"). The term "controller" or "control unit" may refer to a hardware device that includes a memory and a processor. The memory is configured to store program instructions, and the processor is specifically programmed to execute program instructions to perform one or more processes described in more detail below. As described herein, the controller may control the operation of units, modules, parts, devices, or the like. Moreover, it should be understood that the methods described below may be executed by a device including the controller together with one or more other components, as recognized by those having ordinary skill in the art.

In addition, the controller of the present disclosure may be implemented as a non-transitory computer-readable recording medium including executable program instructions executed by a processor. Examples of computer-readable recording media include ROMs, RAMs, compact disk (CD) ROMs, magnetic tapes, floppy disks, flash drives, smart cards, and optical data storage devices, but are not limited thereto. The computer-readable recording medium may also be distributed throughout a computer network, such that the program instructions are stored and executed in a distributed manner, e.g., by a telematics server or a controller area network (CAN).

The inventive concepts of the present disclosure are described in detail below with reference to the accompanying drawings so that those having ordinary skill in the art to which the present disclosure pertains may carry out embodiments of the present disclosure. However, embodiments of the present disclosure may be implemented in various different forms. The present disclosure is not limited to the embodiments described herein.

In order to more clearly describe embodiments of the present disclosure, a detailed description of parts or components determined to be unrelated or extraneous to the inventive concept described herein have been omitted. Further, the identical or similar components are denoted by the same reference numerals throughout the specification and drawings.

In addition, the size and thickness of each component shown in the drawings are arbitrary for convenience of explanation. The present disclosure is not necessarily limited to what is illustrated in the drawings. For example, thicknesses of several portions and regions may have been enlarged for clarity.

The suffixes "module" and/or "unit" used to describe constituent components in the description below are used in order to facilitate the description. The suffixes themselves do not have a distinctive meaning or functions.

In addition, in the following description, specific descriptions of relevant known technologies have been omitted where it has been determined that the specific descriptions thereof may unnecessarily obscure the gist of the embodiments described in the present disclosure.

Further, the accompanying drawings are provided only to allow those having ordinary skill in the art to understand the embodiments described in the present disclosure. It should be understood that the technical idea disclosed in the present specification is not limited by the accompanying drawings. Rather, the present disclosure includes all modifications, equivalents, and substitutions that fall within the spirit and the technical scope of the present disclosure.

Terms including ordinal numbers such as first and second may be used to describe various components, but these components are not limited by these terms. These terms are used only for the purpose of distinguishing one component from another component.

As used herein, a singular form may be intended to include a plural form unless the explicit expression such as "one" or "single" is used.

In a flowchart described with reference to the drawings, the order of operations may be changed, several operations may be merged, a certain operation may be divided, and a specific operation may not be performed.

When a component, device, element, or the like of the present disclosure is described as having a purpose or performing an operation, function, or the like, the component, device, or element should be considered herein as being "configured to" meet that purpose or perform that operation or function.

Hereinafter, a multi-functional switch for a vehicle according to embodiments of the present disclosure is described in detail with reference to the accompanying drawings.

Figure 2:
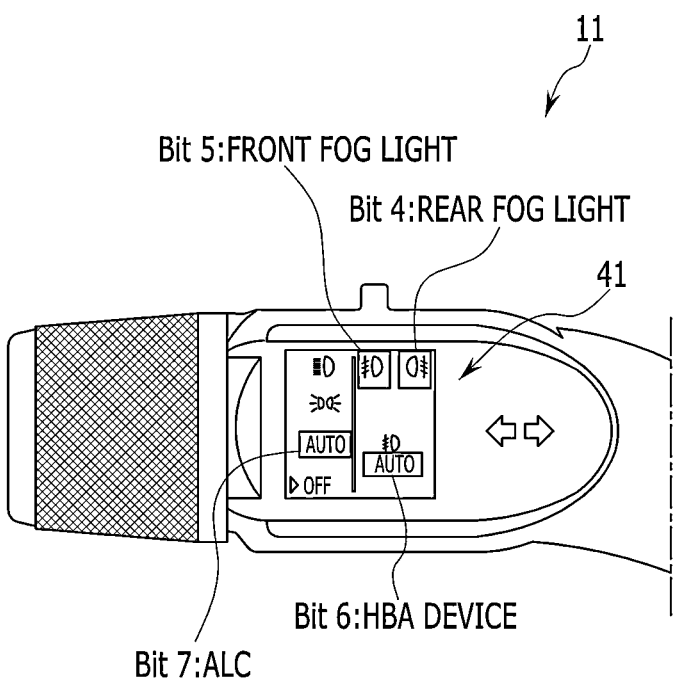
FIG. 2 is a diagram illustrating a configuration of a display unit provided on a left lever, according to an embodiment.
Figure 3:
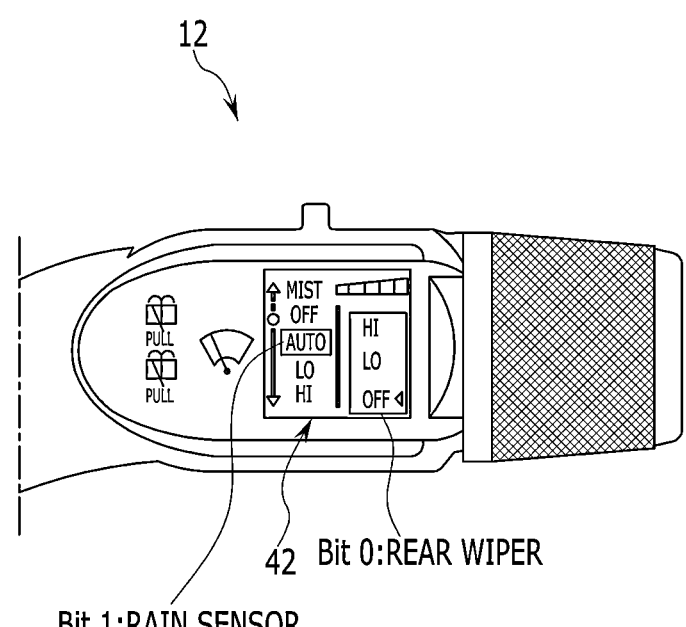
FIG. 3 is a diagram illustrating a configuration of a display unit provided on a right lever, according to an embodiment.
Figure 4:
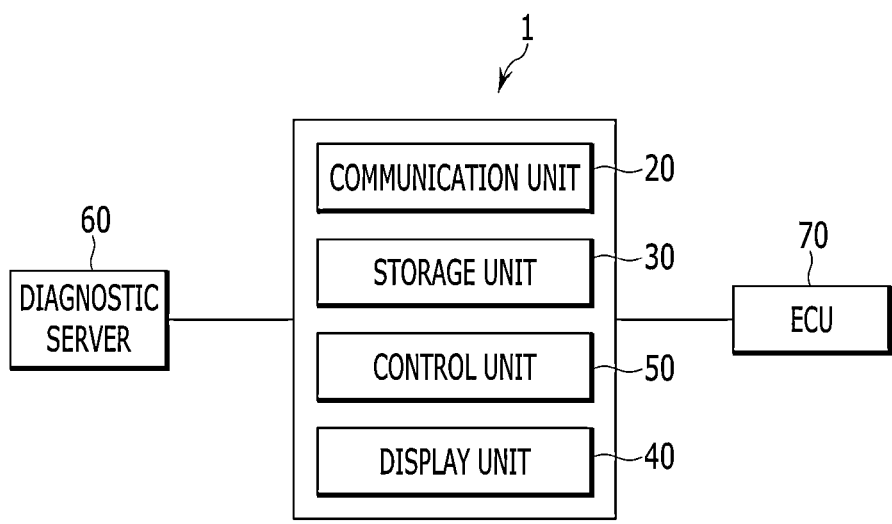
FIG. 4 is a block diagram illustrating a configuration of a multi-functional switch, according to an embodiment.

FIG. 1 is a diagram illustrating a configuration of a multi-functional switch, according to an embodiment. FIG. 2 is a diagram illustrating a configuration of a display unit provided on a left lever, according to an embodiment. FIG. 3 is a diagram illustrating a configuration of a display unit provided on a right lever, according to an embodiment. FIG. 4 is a block diagram illustrating a configuration of a multi-functional switch, according to an embodiment.

As illustrated in FIGS. 1-4, a multi-functional switch 1 for a vehicle, according to an embodiment, may include a main body 10 installed behind a steering wheel, a left lever 11 provided on the left side of the main body 10, and a right lever 12 provided on the right side of the main body 10. A communication unit 20, a storage unit 30, and a control unit 50 may be provided in the main body 10. A display unit 40 may be provided in at least one of the left lever 11 and the right lever 12. In an embodiment, the display unit 40 may include a first display unit 41 and a second display unit 42.

The left and right turn signal lights may be operated by the left lever 11. For example, the left turn signal light may be turned on when the driver operates the left lever 11 in a downward direction and the right turn signal light may be turned on when the driver operates the left lever 11 in an upward direction.

The first display unit 41 may be provided in the left lever 11. The first display unit 41 may display images and/or symbols corresponding to functions (first functions) of electronic devices related to lighting devices among electronic devices. For example, the functions of the electronic devices related to the lighting devices may include an auto light control (ALC) device, a high beam assist (HBA) device that adjusts an irradiation angle of a high beam, a front fog light, a rear fog light, or the like.

Wipers of the vehicle may be operated by the right lever 12. For example, front wipers installed on a front windshield may be operated continuously when the right lever 12 is operated in the downward direction. As another example, the front wipers may be operated only once when the right lever 12 is operated in the upward direction.

The second display unit 42 may be provided in the right lever 12. The second display unit 42 may display images and/or symbols corresponding to functions (second functions) of wiper devices among electronic devices. For example, the functions of the wiper devices may include a rain sensor that measures an amount of rain and a rear wiper provided on a rear windshield.

The functions of the left lever 11 and the right lever 12 may be interchanged if necessary.

The communication unit 20 may receive a specification code for electronic devices determined according to a vehicle identification number of the vehicle by communicating with a diagnostic server 60. The communication unit 20 may also receive specification information for checking whether the electronic devices are present in the vehicle by communicating with an electronic control unit (ECU) 70 in the vehicle.

The electronic devices provided in the vehicle and operated through the multi-functional switch 1 may include an auto light control (ALC) device that turns on/off headlights depending on the light level outside the vehicle, a high beam assist (HBA) device that adjusts an irradiation angle of a high beam, a front fog light, a rear fog light, a rain sensor that measures an amount of rain used to adjust a speed of the wipers, and/or a rear wiper provided on the rear windshield.

The communication unit 20 may communicate with the diagnostic server 60 through a unified diagnostic services (UDS) protocol. The communication unit 20 may also communicate with the electronic control unit 70 through controlled area network (CAN) communication.

The diagnostic server 60 may inspect various devices of the vehicle in the final process of the production line among the vehicle assembly processes. The diagnostic server 60 may transmit a specification code for electronic devices of the vehicle, that is determined according to a vehicle identification number of the vehicle transported according to the manufacturing process, to the control unit 50 of the multi-functional switch 1 through the communication unit 20. The electronic control unit 70 may control electronic devices provided in the vehicle. The electronic control unit 70 may also transmit specification information for checking whether each of the electronic devices is present to the control unit 50 by communicating with the communication unit 20.

The storage unit 30 may store the specification code received from the diagnostic server 60 through the communication unit 20 and the specification information received from the electronic control unit 70. The storage unit 30 may be implemented as a non-volatile memory device such as an electrically erasable programmable read-only memory (EEPROM).

The display unit 40 may display functions of the electronic devices provided in the vehicle according to the specification code and/or the specification information stored in the storage unit 30. The display unit 40 may be implemented through a liquid crystal display (LCD), a light emitting diode (LED) device, or the like.

The control unit 50 may control the display unit 40 to display images or symbols corresponding to the functions of the electronic devices provided in the vehicle based on the specification code and the specification information received through the communication unit 20.

The control unit 50 include one or more processors operating according to a set program. A memory (e.g., the storage unit 30) may store program instructions programmed to perform each step of a method of controlling the multi-functional switch 1 according to embodiments of the present disclosure by the one or more processors.

Hereinafter, a method of controlling a multi-functional switch, according to an embodiment, is described in more detail with reference to the accompanying drawings.

Figure 5:
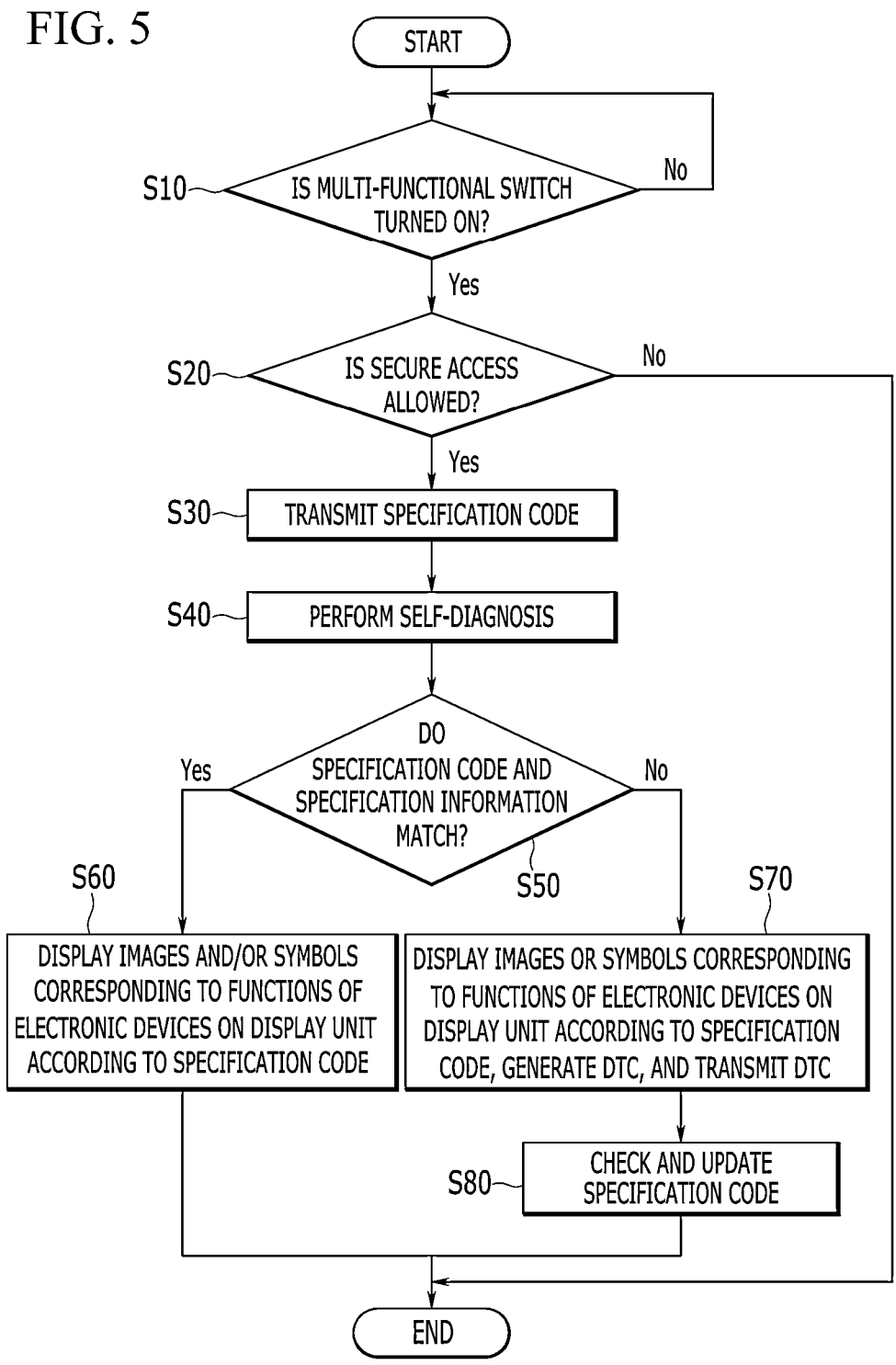
FIG. 5 is a flowchart illustrating a method of controlling a multi-functional switch, according to an embodiment.

FIG. 5 is a flowchart illustrating a method of controlling a multi-functional switch, according to an embodiment.

Referring to FIG. 5, when the multi-functional switch 1 is turned on, the communication unit 20 of the multi-functional switch 1 communicates with the diagnostic server 60, the setting of specifications of the multi-functional switch 1 is started in an operation S10.

Because the setting of specifications of the multi-functional switch 1 needs to be performed in a secure state, the diagnostic server 60 checks whether the secure access to the multi-functional switch 1 is allowed in an operation S20.

For example, the diagnostic server 60 may request the multi-functional switch 1 to transmit a random seed.

According to the request from the diagnostic server 60, the multi-functional switch 1 may generate a seed, and may transmit the generated seed to the diagnostic server 60. The diagnostic server 60 may also calculate the key value using the generated seed, and may transmit the calculated key value to the diagnostic server 60. The random seed may be calculated as an arbitrary random value by a specific algorithm.

The diagnostic server 60 may generate a key value using the seed received from the multi-functional switch 1. The diagnostic server 60 may compare the generated key value with the key value received from the multi-functional switch 1 to determine whether they match.

When the key value calculated by the diagnostic server 60 and the key value calculated by the multi-functional switch 1 match, secure access is allowed.

When the key value calculated by the diagnostic server 60 and the key value calculated by the multi-functional switch 1 are different, the diagnostic server 60 may terminate the communication with the multi-functional switch 1. The setting of specifications of the multi-functional switch 1 may thus be terminated.

In an operation S30, the diagnostic server 60 transmits a specification code determined according to a vehicle identification number to the multi-functional switch 1.

The specification code may be constituted by a plurality of set bits, and the function of each of the electronic devices may be determined from values of the plurality of bits. Alternatively, whether each of the electronic devices is provided in the vehicle may be determined from values of the plurality of bits.

For example, the specification code may be configured as an 8-bit code, and each bit may contain information corresponding to the function of each of the electronic devices (or information regarding whether each of the electronic devices is provided in the vehicle).

Referring to FIG. 6, bit 0 (the lowest, or the least significant, bit) of the specification code may indicate whether a rear wiper is present. For example, i) when bit 0 is 0, the vehicle may not have a rear wiper function and ii) when bit 0 is 1, the vehicle may have a rear wiper function, or vice versa.

Bit 1 may indicate whether a rain sensor function is present. For example, i) when bit 1 is 0, the vehicle may not have a rain sensor function and ii) when bit 1 is 1, the vehicle may have a rain sensor function, or vice vera.

Bit 2 may indicate a form of an image and/or a symbol displayed on the display unit 40. For example, i) when bit 2 is 0, the function of the electronic device may be displayed in text format on the display unit 40 and ii) when bit 2 is 1, the function of the electronic device may be displayed in image or symbol format on the display unit 40, or vice vera.

Bit 3 may be unused.

Bit 4 may indicate whether a rear fog light is present. For example, i) when bit 4 is 0, the vehicle may not have a rear fog light and ii) when bit 4 is 1, the vehicle may have a rear fog light, or vice vera.

Bit 5 may indicate whether a front fog light is present. For example, i) when bit 5 is 0, the vehicle may not have a front fog light and ii) when bit 5 is 1, the vehicle may have a front fog light, or vice vera.

Bit 6 may indicate whether an HBA device is present. For example, i) when bit 6 is 0, the vehicle may not have an HBA device and ii) when bit 6 is 1, the vehicle may have an HBA device, or vice vera.

Bit 7 (the highest, or the most significant, bit) may indicate whether an auto light control device is present. For example, i) when bit 7 is 0, the vehicle may not have an auto light control device and ii) when bit 7 is 1, the vehicle may have an auto light control device, or vice vera.

Accordingly, in an embodiment, i) when the function of an electronic devices is present, the corresponding bit may be displayed as 1 and ii) when the function of electronic devices is not present, the corresponding bit may be displayed as 0, or vice vera.

Upon receiving the specification code transmitted from the diagnostic server 60, the received specification code may be stored in the storage unit 30. Further, in an operation S40, the multi-functional switch 1 performs self-diagnosis to check whether the function of each of the electronic devices is present.

For example, the control unit 50 of the multi-functional switch 1 may check whether the function of each of the electronic devices is present through CAN communication with the electronic control unit (ECU) 70 that controls each of the electronic devices.

The control unit 50 of the multi-functional switch 1 may then generate specification information. The specification information may be transmitted to the diagnostic server 60 through the communication unit 20.

In an operation S50, the control unit 50 determines whether the specification code and specification information match.

In an operation S60, when the specification code and the specification information match, the control unit 50 of the multi-functional switch 1 displays images or symbols corresponding to the functions of the electronic devices on the display unit 40 according to the specification code.

For example, it is assumed that the specification code stored in the storage unit 30 is a binary code "11110011".

In this case, it can be seen that the vehicle has the functions of an auto light control device, an HBA device, a front fog light, a rear fog light, a rain sensor, and a rear wiper device.

Therefore, the first display unit 41 may display images and/or symbols corresponding to the functions of the auto light control device, the HBA device, the front fog light, and the rear fog light in the vehicle, as illustrated in FIG. 2, for example. In addition, the second display unit 42 may display images and/or symbols corresponding to the functions of the rain sensor and the rear wiper device, as illustrated in FIG. 3, for example.

Assuming that the specification code received from the diagnostic server 60 is a binary code "11100001", the functions of an auto light control device, an HBA device, a front fog light, and a rear wiper are present, but the functions of a rear fog light and a rain sensor are not present.

Figure 7:
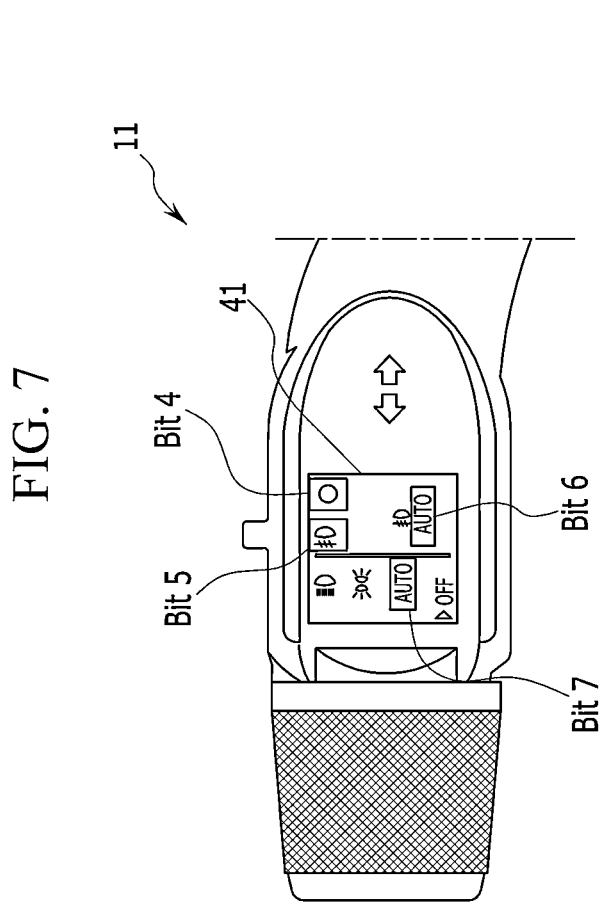
FIG. 7 is a diagram illustrating a first display unit of a multi-functional switch, according to an embodiment.
Figure 8:
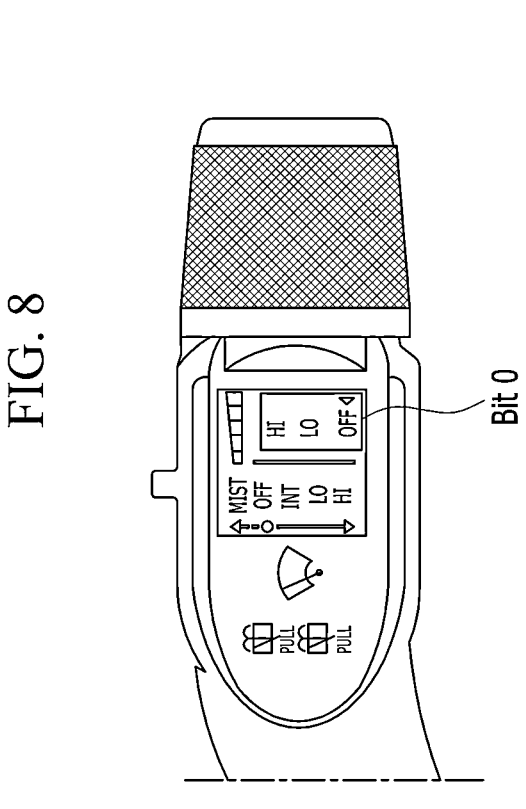
FIG. 8 is a diagram illustrating a second display unit of a multi-functional switch, according to an embodiment.

Therefore, the first display unit 41 does not display an image or a symbol corresponding to the function of the rear fog light, but only displays images or symbols corresponding to the functions of the auto light control device, the HBA device, and the front fog light, as illustrated in FIG. 7, for example. In addition, the second display unit 42 does not display an image or a symbol corresponding to the function of the rain sensor, but only displays an image or a symbol corresponding to the function of the rear wiper device, as illustrated in see FIG. 8, for example.

Referring again for FIG. 6, in an operation S70, when the specification code and the specification information do not match, the control unit 50 of the multi-functional switch 1 displays images or symbols corresponding to the functions of the electronic devices on the display unit 40 according to the specification code received from the diagnostic server 60, generates a diagnostic trouble code (DTC), and transmits the generated diagnostic trouble code (DTC) to the diagnostic server 60.

In an operation S80, upon receiving the diagnostic trouble code from the multi-functional switch 1, the diagnostic server 60 may check and update the specification code determined according to the vehicle identification number of the vehicle.

The multi-functional switch 1 for a vehicle and a method of controlling the same according to embodiments are capable of reducing a vehicle manufacturing cost by displaying images or symbols corresponding to the functions of the electronic devices provided in the vehicle on the display unit 40 according to a specification code transmitted from the diagnostic server 60, because there is no need to separately engrave images corresponding to the functions of the electronic devices on the multi-functional switch 1 according to the specifications of the vehicle.

Figure 9:
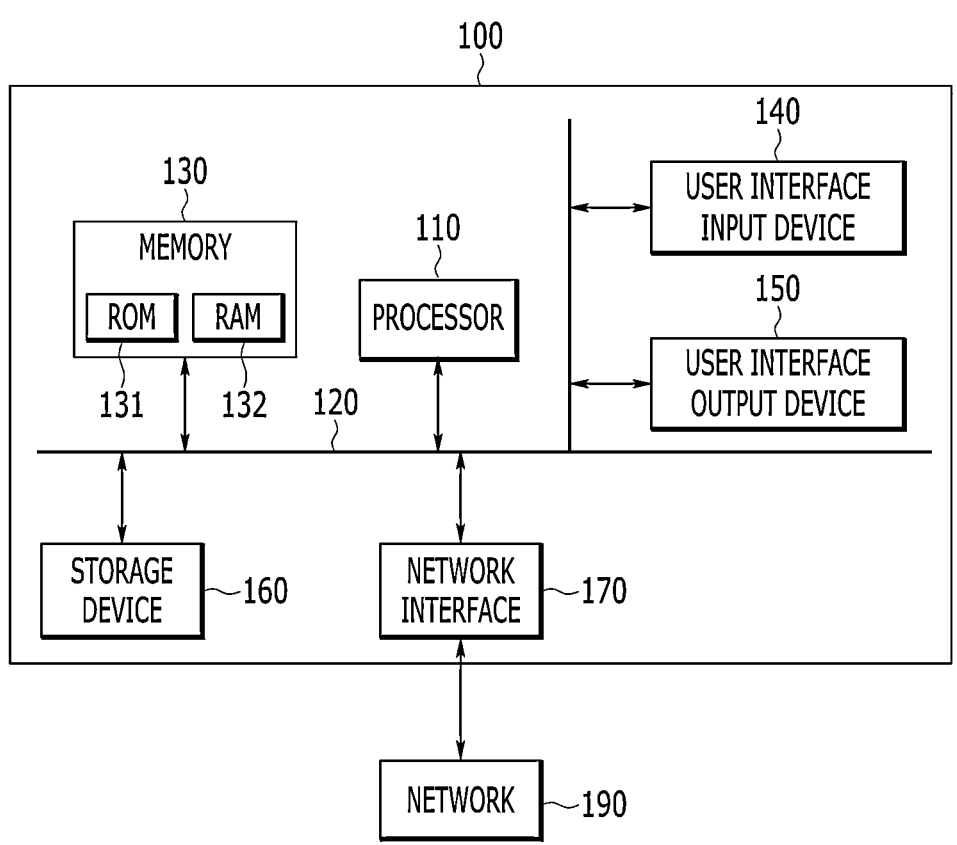
FIG. 9 is a block diagram of a computing device, according to an embodiment.

FIG. 9 is a block diagram of a computing device, according to an embodiment.

Referring to FIG. 9, a method of controlling a multi-functional switch according to an embodiment may be implemented using a computing device 100.

The computing device 100 may include at least one of a processor 110, a memory 130, a user interface input device 140, a user interface output device 150, and a storage device 160 that communicate with each other through a bus 120. The computing device 100 may also include a network interface 170 electrically connected to a network 190. The network interface 170 may transmit or receive signals to and from other entities through the network 190.

The processor 110 may be implemented a various processor types such as a micro controller unit (MCU), an application processor (AP), a central processing unit (CPU), a graphic processing unit (GPU), a neural processing unit (NPU), or the like. The processor 110 may be any semiconductor device that executes instructions stored in the memory 130 or the storage device 160. The processor 110 may be configured to implement the functions and methods described above with reference to FIGS. 1-8.

Memory 130 and storage device 160 may include various types of volatile or non-volatile storage media. For example, the memory may include a read only memory (ROM) 131 and a random access memory (RAM) 132. In this embodiment, the memory 130 may be located inside or outside the processor 110, and the memory 130 may be connected to the processor 110 through various known means.

In some embodiments, at least some configurations or functions of the multi-functional switches and the methods of controlling the same according to the embodiments may be implemented with a program or software running or otherwise executing on the computing device 100. The program or software may be stored in a computer-readable medium (e.g., the memory 130).

In some embodiments, at least some configurations or functions of the methods of controlling the multi-functional switches according to the embodiments may be implemented using hardware or circuitry of the computing device 100, or may be implemented with separate hardware or circuitry that may be electrically connected to the computing device 100.

Although certain embodiments of the present disclosure have been described above, the present disclosure is not limited thereto. Rather, various modifications may be made within the scope of the claims, the detailed description of the disclosure, and the accompanying drawings. Such modifications also fall within the scope of the present disclosure.

DESCRIPTION OF SYMBOLS

1: multi-functional switch
10: main body
11: left lever
12: right lever
20: communication unit
30: storage unit
40: display unit
41: first display unit
42: second display unit

50: control unit
60: diagnostic server
70: electronic control unit

What is claimed is:

1. A multi-functional switch for a vehicle, the multi-functional switch comprising:
   a communication unit configured to i) receive a specification code for electronic devices determined according to a vehicle identification number of the vehicle by communicating with a diagnostic server and ii) receive specification information for checking whether the electronic devices are present in the vehicle by communicating with an electronic control unit in the vehicle;
   a storage unit configured to store the specification code received from the diagnostic server;
   a display unit; and
   a control unit configured to control the display unit to display images corresponding to functions of the electronic devices present in the vehicle, based on the specification code and the specification information received through the communication unit,
   wherein the control unit is configured to:
      based on determining that the specification code and the specification information match, control the display unit to display images corresponding to functions of the electronic devices present in the vehicle, according to the specification code, and
      based on determining that the specification code and the specification information are different from each other, i) generate a diagnostic trouble code and ii) transmit the diagnostic trouble code to the diagnostic server through the communication unit.

2. The multi-functional switch of claim 1, wherein the display unit includes:
   a first display unit configured to display first functions of the electronic devices; and
   a second display unit configured to display second functions of the electronic devices.

3. The multi-functional switch of claim 2, wherein:
   the first functions are functions of lighting devices; and
   the second functions are functions of wiper devices.

4. The multi-functional switch of claim 1, wherein:
   the specification code includes a plurality of bits; and
   the functions of the electronic devices are indicated by values of the plurality of bits.

5. A method of controlling a multi-functional switch for a vehicle, the method comprising:
   receiving, by a communication unit, a specification code for electronic devices determined according to a vehicle identification number of the vehicle from a diagnostic server;
   receiving, by the communication unit, specification information for checking whether the electronic devices are present in the vehicle by communicating with an electronic control unit of the vehicle;
   controlling, by a control unit, a display unit to display images corresponding to functions of the electronic devices present in the vehicle, based on the specification code and the specification information, wherein controlling the display unit includes, based on determining that the specification code and the specification information match, controlling the display unit to display images corresponding to the electronic devices according to the specification code; and transmitting, by the control unit, a diagnostic trouble code to the diagnostic server, based on determining that the specification code and the specification information are different from each other.

6. The method of claim 5, wherein:

the specification code includes a plurality of bits; and the method includes determining, by the control unit, whether the electronic devices are provided in the vehicle based on values of the plurality of bits.

* * * * *